United States Patent
Martinchek et al.

(10) Patent No.: US 9,627,705 B2
(45) Date of Patent: Apr. 18, 2017

(54) FUEL CELL STACK ASSEMBLY—DATUM DESIGN FOR FUEL CELL STACKING AND COLLISION PROTECTION

(71) Applicant: GM Global Technology Operations LLC, Detroit, MI (US)

(72) Inventors: David A. Martinchek, Spencerport, NY (US); Robert C. Thompson, Lockport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 76 days.

(21) Appl. No.: 14/670,508

(22) Filed: Mar. 27, 2015

(65) Prior Publication Data

US 2016/0285124 A1 Sep. 29, 2016

(51) Int. Cl.
 *H01M 8/24* (2016.01)
 *H01M 8/2475* (2016.01)
 *H01M 8/2404* (2016.01)

(52) U.S. Cl.
 CPC ....... *H01M 8/2475* (2013.01); *H01M 8/2404* (2016.02)

(58) Field of Classification Search
 CPC .......... H01M 8/2485; H01M 8/2475
 See application file for complete search history.

(56) References Cited

U.S. PATENT DOCUMENTS

| | | | | |
|---|---|---|---|---|
| 2009/0004519 A1* | 1/2009 | Vitella | ............... | H01M 8/0258 429/457 |
| 2009/0188099 A1* | 7/2009 | Keyser | ............... | B23K 9/02 29/464 |
| 2011/0244355 A1* | 10/2011 | Skala | ............... | H01M 8/04201 429/468 |
| 2012/0045709 A1* | 2/2012 | Miller | ............... | B23K 31/02 429/467 |
| 2014/0272662 A1 | 9/2014 | Rock et al. | | |
| 2016/0072145 A1* | 3/2016 | Martinchek | ............... | H01M 8/247 429/457 |

* cited by examiner

*Primary Examiner* — Stewart Fraser
(74) *Attorney, Agent, or Firm* — Quinn IP Law

(57) ABSTRACT

A system and method for aligning and reducing the relative movement between adjacent fuel cells within a fuel cell stack. The inter-cell cooperation between fuel cells along a stacking dimension is enhanced by one or more datum placed along the edge of a bipolar plate that makes up a part of a cell-containing assembly. The datum is shaped along a thickness that substantially coincides with the cell stacking dimension to avoid shifting between adjacently-stacked cells that may otherwise arise out of the occurrence of a significant acceleration along the dimension that defines the major surfaces of the plates, cells and their respective assemblies. By having the datum be integrally formed with numerous stacked cells, the need to affix individual tabs each plate is avoided.

20 Claims, 6 Drawing Sheets

FUEL CELL STACK ASSEMBLY—DATUM DESIGN FOR FUEL CELL STACKING AND COLLISION PROTECTION

BACKGROUND

The present disclosure relates generally to an improved design for assembling a fuel-cell stack, and more particularly to a way to distribute an acceleration load over a fuel-cell stack to secure and maintain the relative position of the fuel cells within the stack after exposure to impacts and other high acceleration loads.

A significant benefit to using fuel cells to convert a fuel into usable electricity via electrochemical reaction is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a gaseous reducing agent (such as hydrogen, $H_2$) is introduced to and ionized at the anode and then made to pass through the ion-transmissive medium such that it combines with a gaseous oxidizing agent (such as oxygen, $O_2$) that has been introduced through the other electrode (the cathode); this combination of reactants form water as a byproduct. The electrons that were liberated in the ionization of the hydrogen proceed in the form of direct current (DC) to the cathode via external circuit that typically includes a load (such as an electric motor) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel-cell stack.

The delivery of the reactants to the MEA—as well as the removal of the byproduct water and the delivery of the cell-generated electrical current to the load—is facilitated through stacked engagement of the MEA, a gas-permeable diffusion medium (also called a gas diffusion medium (GDM)) and a multi-channeled bipolar plate. In addition to establishing a planar facing relationship with the MEA and GDM, the bipolar plate defines a manifold as part of a frame-like structure that is sized to be placed about the periphery of the MEA and GDM to facilitate the reactant, coolant and byproduct movement within the stack.

Fuel-cell stacks placed within vehicles must be able to withstand severe load changes from acceleration and deceleration of the vehicle, as well as from crashes, accidents and related impacts. In particular, in order to continue to perform after exposure to high acceleration loads (for example, up to 160 g or more) during disruptive events such as a vehicle crash, the position of the fuel cells that make up the stack must be retained relative to one another. In such events, a high shearing force may cause sliding between adjacent cells of the stack (especially within the X-Z plane of the aforementioned Cartesian coordinate system). Small displacements between individual cells is magnified over the height of a large stack assembly (for example, a 100 micron cell shift can result in a 30 mm fuel-cell stackshift for a 300-cell fuel-cell stack assembly). Such problems may be exacerbated by cold start conditions where thermally-induced contraction may reduce the Y-axis compressive retention load that was placed on the cells during stack assembly, as well as by reduced inter-cell friction brought about by the use of surface treatments or inserts that may have low coefficient of friction attributes.

One way to avoid automotive fuel cell inter-plate or inter-cell shifting during these high-acceleration events is to leave datum pins that are used in stack assembly coupled to the stack even after the assembling process is complete; in this way, the pins provide additional resistance to the shearing movement between the adjacently-stacked plates or cells. In the present context, these shearing or in-plane shifts between adjacent cells or plates are premised on the understanding that the cell or plate stacking axis is orthogonal to the direction of travel of the vehicle being powered by such stack. As such, the stacking axis may be along a substantially vertical (i.e., Y) Cartesian axis so that the majority of inter-cell or inter-plate movement sought to be minimized is in the X-Z plane. It will be appreciated by those skilled in the art that the particular orientation of the cells, plates and stack isn't critical, but rather that the means used to avoid or reduce such inter-cell or inter-plate shifting are preferably arranged in an orientation that maximizes such avoidance. While the use of conventional datum pins and related structures are effective at maintaining the relative stacking alignment of the cells or plates when exposed to a high acceleration in-plane load, they can significantly add to the cost of assembly of the stack. Their continued presence within the stack also militates against disassembly in the event one of the cells or other stack components needs to be removed for service.

Another way to avoid automotive fuel cell inter-plate or inter-cell shifting during such a disruptive event is through the use of adhesives or supplemental support structure that can be formed between a housing wall and the stack. An example of this may be found in U.S. patent application Ser. No. 13/803,098 that was filed on Mar. 14, 2013 and entitled CELL RETENTION DESIGN AND PROCESS that is owned by the Assignee of the present application and incorporated herein by reference in its entirety; the approach taught therein uses an insertable adhesive-like potting compound between the lateral edges of the stacked plates and a rigid housing or related enclosure. Nevertheless, this approach is only applied after the cells and plates have been aligned and stacked, and therefore does nothing to help with the alignment of the cells and plates during the stacking process. Moreover, the permanent nature of the compound being used is not conducive to subsequent stack disassembly for repair or diagnostic analysis.

Yet another approach involves welding (or otherwise attaching) a tab that projects laterally from one or more of the edges of the generally rectangular bipolar plate. These tabs may be made to engage with one another along the through-the-thickness (i.e., Y-axis) dimension such that the tendency of each cell or plate within the stack to move in response to a shearing (i.e., in-plane) force is resisted by the interfering contact of the tab and cutout. While effective at preventing inter-cell/inter-plate movement, each tab must be individually joined to its corresponding plate.

SUMMARY

According to one aspect of the present disclosure, a method of assembling a fuel-cell stack that has an improved resistance to inter-cell shifting in response to a disruptive event is disclosed. The method includes arranging numerous bipolar plates along a stacking dimension and adding a potting material to at least one peripheral edge that is formed by the stacked plates; the resulting datum (also called datum structure) is possessive of an enhanced thickness dimension along the cell stacking dimension; the enhanced thickness corresponds to the number of stacked cells and plates of a particular group. Thus, an 8-plate group would have a corresponding 8-datum thickness, while a 16-plate or a 32-plate group would have a corresponding datum thickness. Preferably, the plates define at least one edgewise undulation to accommodate the complementary shape of the potting material. This way, the datum is secured to the stacked cells within a multi-cell group such that a snug, cooperative fit is formed between them. In the present context, the securing of the datum to the stacked cells within a group is via the cured potting material forming a bond with, around or otherwise coupled to the edge undulation on each of the cells. In one preferred from, the undulation is an outwardly-projecting tab that can be overmolded by the potting material. In turn, the potting material defines a shape such the outward projection formed thereby may fit into a complementary-shaped cutout or recess formed within a stack housing or related enclosure. In a preferred form, the potting material is built up along the stacking dimension to be as thick as numerous plates. In a more preferred form, the cooperation between the datum that is formed by the potting material and the various plates is through an overmolding of the potting material onto integrally-formed tabs that extend edgewise from the plate periphery. In this last embodiment, the multilayer thick datum formed by the potting material may be shaped to cooperate with a complementary-shaped lateral undulation formed within the stack enclosure or housing such that any shearing motion imparted to the various stacked plates is passed through the thick datum an into the housing to provide the increased resistance. One or more fixtures may be used to facilitate the stacking process, as well as form a mold cavity or shape at the plate lateral edge into which the potting material may be poured. In the present context, either the singular or plural recitation of such a fixture is deemed to be within the scope of the present invention.

According to another aspect of the present disclosure, a method of assembling numerous fuel cells together is disclosed. Each cell includes an MEA placed facingly-adjacent to a bipolar plate that defines at least one integrally-formed edge extension therein. The method includes defining within a stacking fixture one or more mold shapes that are configured to receive a potting material. The fuel cells are arranged along a stacking dimension within the stacking fixture such that a liquid form of the potting material is poured into the mold such that upon curing, the potting material forms a datum that is secured to the various arranged fuel cells along their stacking dimension, thereby providing an increased resistance to inter-cell movement of the arranged fuel cells along a dimension that is substantially orthogonal to the stacking dimension. As discussed elsewhere, the number of cells that may be stacked into a module with a datum acting as the affixing or connecting point may be determined by other stacking needs of a fuel-cell system; in one form, the number of cells within each arranged module may be in multiples of 8, such as 8, 16, 24 or 32, where limits on the upper bound of cells is dictated by the mechanical properties (such as shear strength) of the potting material.

According to yet another aspect of the present disclosure, a fuel-cell stack is disclosed. The stack includes numerous fuel cells arranged in an adjacently facing relationship along a stacking dimension (for example, the aforementioned Y-axis in a conventional Cartesian coordinate system), and a respective bipolar plate for each of the cells. A potting material is secured to the stacked, arranged fuel cells along their stacking dimension to provide an increased resistance to inter-cell movement along a dimension that has at least a component that is substantially orthogonal to the stacking dimension.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
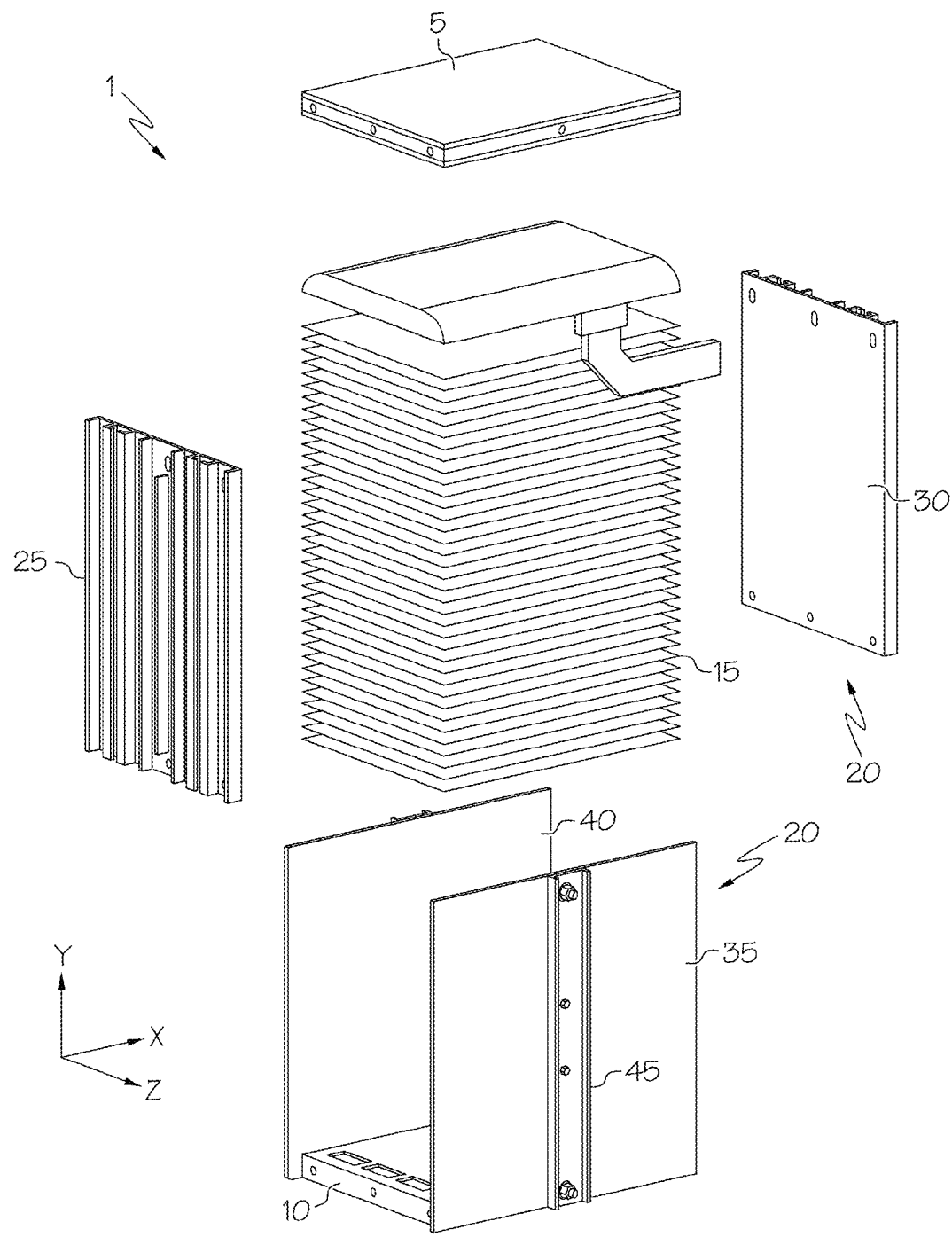
FIG. 1 is a simplified exploded view of a fuel-cell stack.
Figure 3:
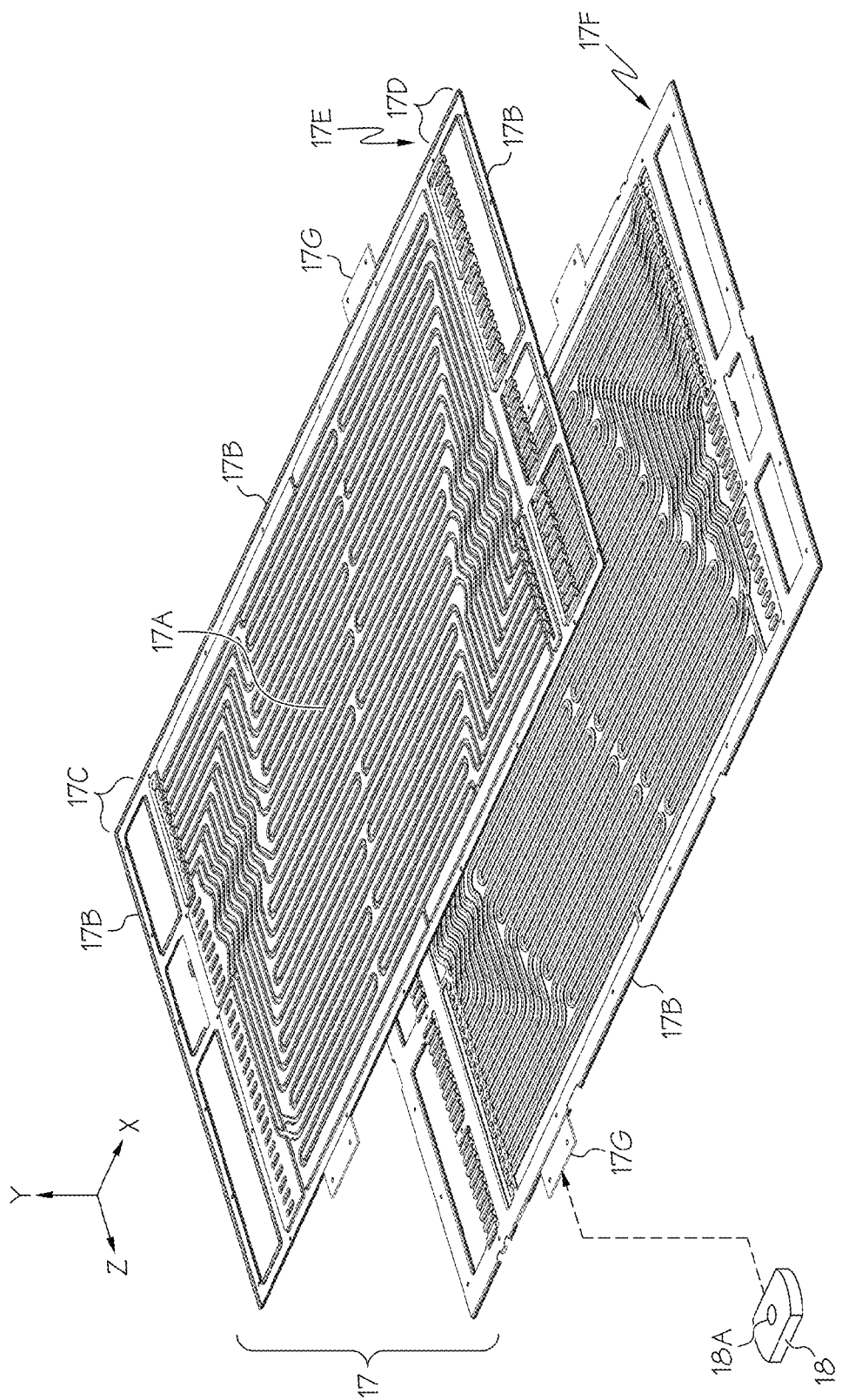
FIG. 3 is a simplified exploded view of a bipolar plate that is used in the fuel-cell stack of FIG. 1.

Referring first to FIGS. 1 and 3, a fuel-cell stack 1 is shown, and includes a dry end unit plate 5, a wet end unit plate 10 and a block of fuel cells 15 placed in stacking alignment between the end unit plates 5, 10. Although not shown in detail, each fuel cell 15 within the block generally includes the anode, cathode, and membrane arranged together to form the generally planar sandwich structure of the MEA that is pressed between a pair of the gas-permeable electrically conductive diffusion media that serve to both deliver reactants (i.e., $H_2$ on the anode side of the MEA and $O_2$ (typically in the form of air) on the cathode side of the MEA as well as collect electrical current that is catalytically produced at the anode and cathode. Fuel cell 15 also includes bipolar plates (also referred to herein as bipolar plate assemblies) 17 that provide supporting structure to the MEA and diffusion media. Within the present context, the stacking dimension that corresponds to the height of the fuel-cell stack 1, when assembled, is defined along the Y-axis as shown, although it will be appreciated by those skilled in the art that such is a matter of convenience, and that any suitable linear dimension is equally suitable, depending on the orientation of the fuel-cell stack 1 during the assembly process.

The numerous individual fuel cells 15 within the fuel-cell stack 1 are kept in place via enclosure or housing 20 made up of a pair of opposing end caps 25, 30, sidewalls 35, 40 and rigid bracketing elements 45 disposed vertically along each of the sidewalls 35, 40 for securing the wet end unit plate 10 to the dry end unit plate 5. In one form, the wet end unit plate 10 is fixedly secured to the opposing end caps 25, 30 while the dry end unit plate 5 is adjustably secured. This latter connection is particularly useful in stack forming situations, as the end-point secured position is not known until final assembly; this in turn allows the securing to be adapted to accommodate a range of possible end-point securing positions. By contrast, the fixed securing of the wet end unit plate 10 means that the positional relationship of the secured components to one another is substantially invariant. Additional details associated with shaped features that may be formed into one or more of end caps 25, 30 and sidewalls 35, 40 will be discussed in conjunction with FIG. 6 below.

Figure 2:
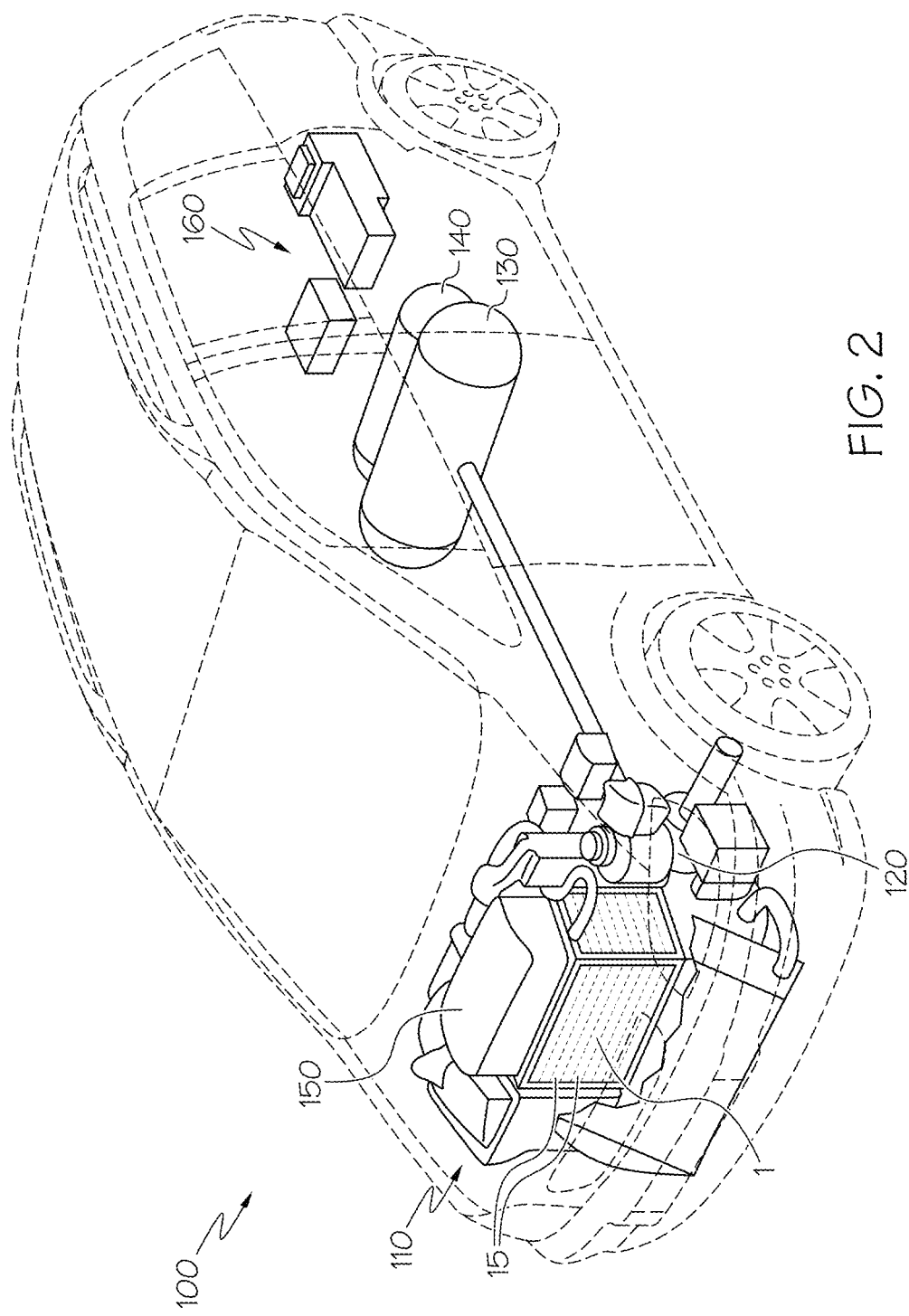
FIG. 2 is a perspective cutaway view of a vehicle with the fuel-cell stack of FIG. 1.

Referring next to FIG. 2, vehicle 100 (for example, a car, van, bus, truck, or motorcycle) includes a fuel-cell based propulsion system 110 made up of an electric motor 120 that receives its electric power from the fuel-cell stack 1 of FIG. 1 that includes numerous individual fuel cells 15. The propulsion system 110 may include one or more fuel storage gas vessels 130, 140, as well as power converters or related electronics 150, electrical storage devices (e.g., batteries, ultra-capacitors or the like) 160 and controllers that provide operational management, and any number of valves, compressors, tubing, temperature regulators, and other ancillary equipment.

Any number of different types of fuel cells 15 may be used to make up the fuel-cell stack 1 of the propulsion system 110; these fuel cells 15 may be of the metal hydride, alkaline, electrogalvanic, or other variants. In one preferred (although not necessary) form, the fuel cells 15 are PEM fuel cells as discussed above, and it is with this configuration that the remainder of the present disclosure is based. In one preferred form, the fuel cells 15 within the fuel-cell stack 1 are combined in series, parallel or a combination of the two in order to produce a higher voltage or current yield, depending on the needs of vehicle 100. It will be understood that the fuel-cell stack 1 may be used for purposes other than motor vehicles.

Referring again to FIG. 3, as with the MEAs and diffusion media (not shown) to which they are attached, each bipolar plate assembly 17 defines a generally rectangular, planar face portion 17A with four edge portions 17B that form a periphery around the face portion 17A. Between the face portion 17A and the two edge portions 17B along the elongate dimension is a pair of header (or manifold) portions 17C, 17D, each disposed on opposing edges such that introduced reactant passes through the numerous serpentine flow field channels formed on the face portion 17A. In one form, one of the header portions 17C, 17D defines a supply (or inlet) header, while the other defines an exhaust header. In an alternate configuration (not shown), the supply header and exhaust header of the header portions 17C, 17D can be situated side-by-side adjacent the same edge of the bipolar plate assembly 17; either variant is compatible with the present invention. In one form, the bipolar plate assembly 17 may be made of separate sheets 17E, 17F (typically between about 75 and 100 microns along the thickness (i.e., stacking) dimension) of a suitable corrosion-resistant material (such as 304 stainless steel) that can be joined together through brazing, laser welding or related operation; in such configuration, the flow channels formed with each face portion 17A may define generally mirror images of one another such that upon stacking of two adjacent fuel cells 15, the face portions 17A of the two sheets 17E, 17F within a single one of the bipolar plate assemblies 17 are in a back-to-back arrangement. In addition to these sheets that include the flow channels for the reactant gas flow field, similarly-shaped sheets (not shown) may be stackingly interspersed to provide a separate coolant-flow circuit; such coolant flow circuits may define any suitable flow channel shape (such as the serpentine shape depicted in flow channels. As with the sheets 17E, 17F, any such additional sheet coolant-flow circuit may also be joined through brazing or some other suitable joining technique. In the present context, the bipolar plate assembly 17 may or may not have the serpentine flow channels formed on both opposing planar faces; for example, when such plate forms the last plate in the fuel-cell stack 1, it would not be necessary to have channels formed in the side that faces the end unit plates (such as end unit plates 5, 10 of FIG. 1).

An edgewise undulation (also called an edgewise extension, lateral extension or the like) in the form of a tab 17G is integrally formed within the plane of each bipolar plate assembly 17. Although tab 17G is presently shown as being outwardly-extending, it will be appreciated by those skilled in the art that various inwardly-projecting tabs (not shown) may also be formed; either variant is deemed to be within the scope of the present invention as long as it provides an integrally-formed member with which the poured potting material may be affixed, bonded or otherwise secured. In the present context, the integral connection between the plate and the tab 17G differs from those that require separate attachment, such as through securing, welding or the like. In this way, additional fabrication steps are avoided. Datum 18 is overmolded over tab 17G with a suitable potting material such that it defines a thickness along the stacking dimension (i.e., the Y axis as shown). As will be discussed in more detail below, a conical feature 18A helps provide resistance to inter-plate sliding or related relative movement. Other forms besides the conical feature 18A may also be used, including a post or pintle (not shown) that mimics the projection of an assembly (i.e., datum) pin along the stacking dimension; these and other forms are deemed to be within the scope of the present invention.

Figure 4:
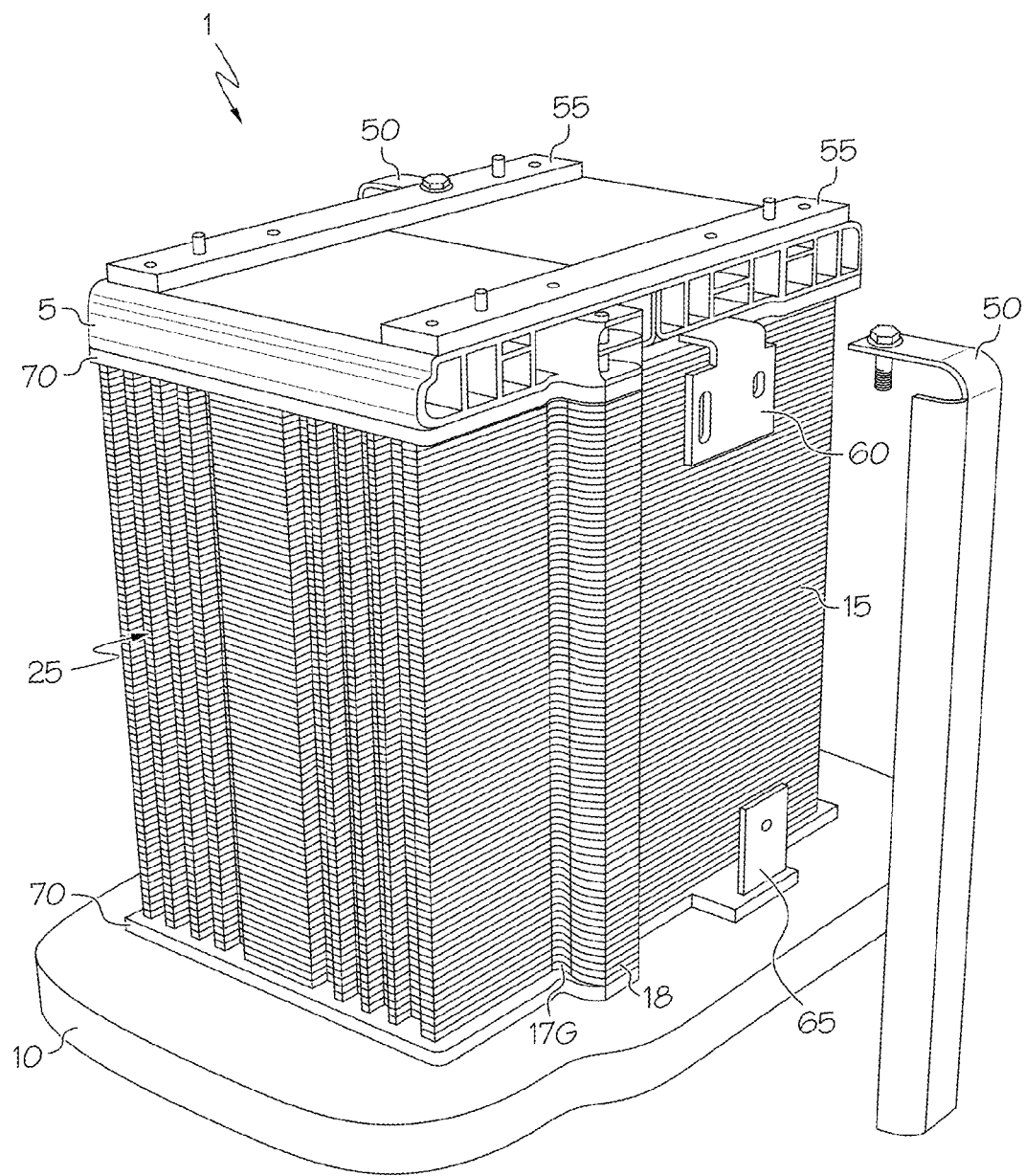
FIG. 4 is a perspective view of a block of fuel cells prior to placement of a housing support structure therearound, where the protruding tabs and overmolded datum are placed along a lateral edge of the corresponding bipolar plates.

Referring next to FIG. 4 in conjunction with FIG. 3, details associated with the formation of a datum 18 along two of the edge portions 17B of numerous stacked cells (shown presently in simplified form as only containing the bipolar plate assemblies 17) are shown. As shown, apertures may be formed in tabs 17G to further help the overmolding of the poured potting material that makes up datum 18. Although the tabs 17G (as well as the overmolded datum formed thereon) are shown disposed along the elongate edges of the bipolar plate assemblies 17, it will appreciated by those skilled in the art that other locations on the plate periphery may also be used. For example, as discussed in conjunction with FIGS. 5A and 5B below, placement of the tabs 17G and their overmolded datum on the corners is also within the scope of the present invention. Likewise, while the shape of the tabs 17G are shown as rectangular, it will be appreciated that other shapes (for example, trapezoidal, semicircular or the like) may also be used, especially if they are helpful in forming the overmolded datum 18. In the particular form shown in FIG. 3, datum 18 defines a conical feature 18A or a related thickness feature that by being substantially hollow within the region defined by the cone allows for nesting of two or more data 18 upon stacking of adjacently-facing groups of bipolar plate assemblies 17. The conical feature 18A of datum 18 is discussed in more detail in related U.S. patent application Ser. No. 14/482,000 that was filed on Sep. 10, 2014 and entitled FUEL CELL STACK ASSEMBLY—DATUM DESIGN FOR FUEL CELL STACKING AND COLLISION PROTECTION that is owned by the Assignee of the present application and incorporated herein by reference in its entirety. Significantly, the use of datum 18 ensures that no pins are required for assembly of the fuel-cell stack 1.

In particular, datum 18 can be used to alleviate concerns over recent design increases in inter-cell sliding resistance (for example, being able to withstand up to about 160 g loads whereas previous designs only required about 40 g) as a way to provide out-of-plane support. In one particular form, datum 18 may be made from a rigid, load-bearing plastic (such as an epoxy or elastomeric material) that may be overmolded onto the tabs 17G that form integral extensions from the edge portions 17B or corners of the individual plates that make up the bipolar plate assembly 17. In this way, a shape (shown and discussed in more detail below in conjunction with FIG. 6) that acts as a mold for the pouring of the potting material during the stack assembly process helps to build up the datum 18 in a columnar configuration for a complementary resistance fit between the datum 18 and the housing 20. Although FIG. 3 presently shows two datum 18 (one each on opposing edge portions 17B) per bipolar plate assembly 17, it will be understood that a greater or fewer number may be formed, depending on the fuel-cell stack 1 configuration. In a preferred form, multiple datum 18 per each grouped bipolar plate assembly 17 are preferred, as not only will this help promote better alignment during assembly of the fuel-cell stack 1, but it may also provide additional shearing movement resistance between adjacent fuel cells 15 within the fuel-cell stack 1 in situations where higher levels of the sliding resistance may be required.

Severe load changes due to a disruptive event, which includes high acceleration or deceleration of the vehicle 100, an impact involving the vehicle 100, or similar impact to the fuel-cell stack 1 itself, such as a vertical fall, can damage the fuel-cell stack 1 or disassemble the fuel-cell stack 1 by causing individual ones of the fuel cells 15 therein to move relative to one another. The mechanical properties of the datum 18 must be sufficient to carry the maximum acceleration that is attendant to such load changes. In one exemplary form, the datum 18 for each corresponding bipolar plate of the bipolar plate assembly 17 within the the fuel-cell stack 1 would have a shear strength of about 150 N as a way to absorb the 160 g loading.

Figure 5A:
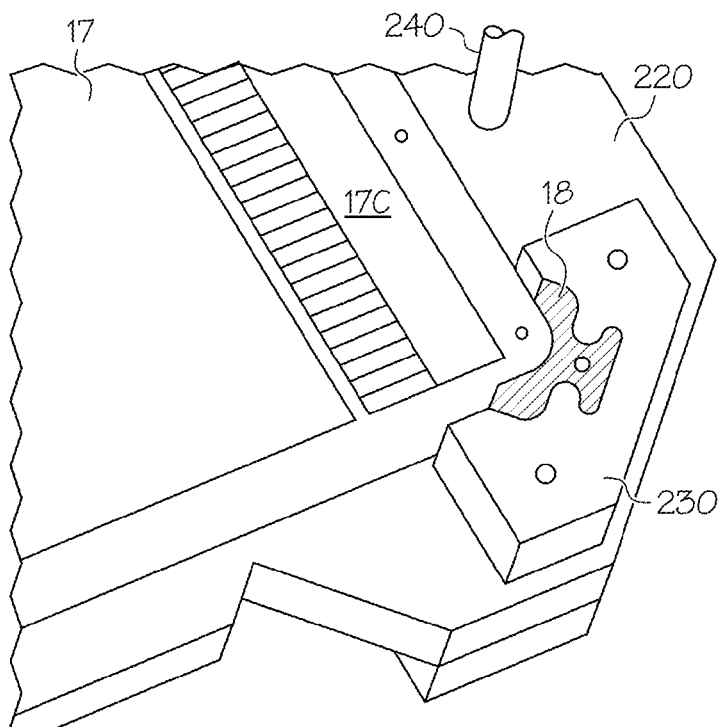
FIG. 5A shows an alternate embodiment of the placement of the protruding tabs and overmolded datum along the corners of a bipolar plate that is placed within a stacking fixture according to an aspect of the present invention.
Figure 5B:
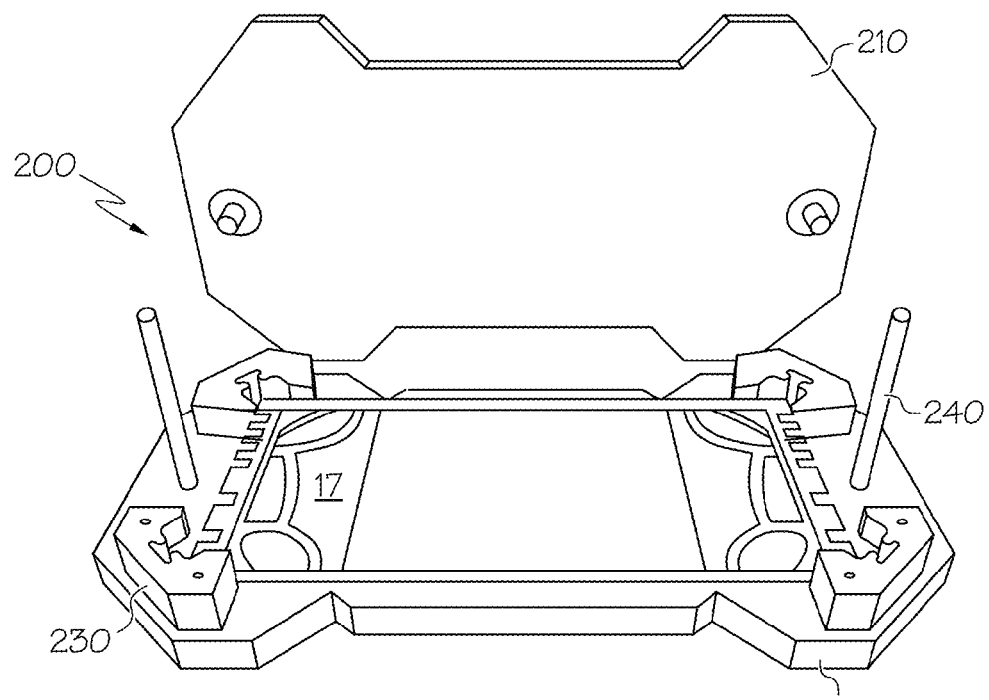
FIG. 5B shows a detailed portion of the corner-placed datum of FIG. 5A.

Referring next to FIGS. 5A and 5B, a variation on the placement and shape of datum 18 is shown. In particular, a fixture 200 used to stack individual ones of the fuel cells 15 includes upper plate 210 and lower plate 220, as well as the corner-mounted datum forms 230 and guide pins 240. Flange mounted bearings 250 are secured to the upper plate 210 to accept the ends of the guide pins 240 that are mounted at their opposing ends to lower plate 220. Additional dowels or related alignment pins (not shown) may also be used. In this variation, the lower plate 220 of fixture 200 includes a generally trapezoidal-shaped mold or related preform 230 that is situated on the four corners of the lower plate 220 to accept the liquid potting material precursor that will (upon curing) become datum 18. The corner of bipolar plate assembly 17 is shaped such that a tab-like extension (that is generally similar to tab 17G of FIG. 3) may engage the datum 18. As mentioned above, the number, shape and placement of the datum 18 may be varied depending on the needs of a fuel-cell system that employs the fuel-cell stack 1.

Figure 6:
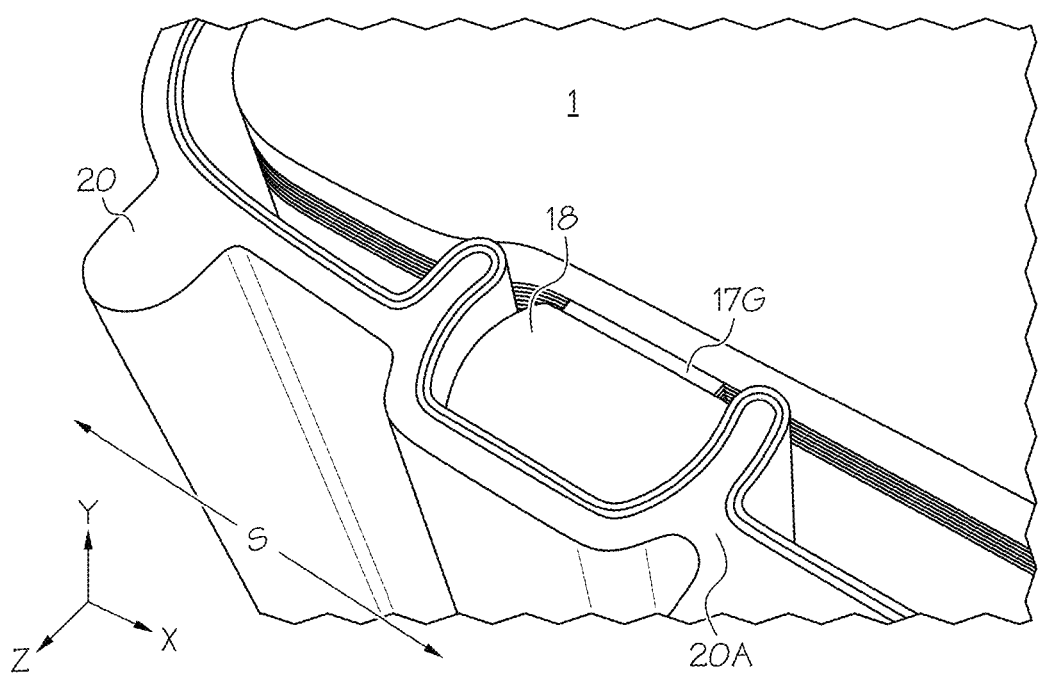
FIG. 6 shows the use of a housing with a feature shaped to cooperate with the datum of FIG. 4 in order to provide another form of supplemental inter-cell sliding resistance.

Referring next to FIG. 6 in conjunction with FIG. 4, other supplemental means may be used to promote improved resistance to shearing and the related inter-cell sliding. For example, FIG. 6 shows with particularity indentations 20A that may be molded or affixed to housing 20. In the version shown, the housing 20 may be of a substantially integral structure (based for example, on extruded aluminum) that is robust enough to provide support to the block of fuel cells 15 during collision and to maintain it in compression along the stacking axis. These shapes define a complementary resistance fit between the molded datum 18 and the indentations 20A formed within housing 20. In such event, the indentations 20A are sized to allow a close-tolerance fit along at least one sliding direction S within the X-Z plane of each bipolar plate assembly 17 within the fuel-cell stack 1, and are spaced to coincide with the edgewise placement of the stacked groups of datum 18 (which are presently shown in an embodiment devoid of the conical feature 18A of the embodiment in FIG. 3). In one preferred form, the indentations 20A are integrally-formed into the housing 20 formed from extruded aluminum, although in another variant, the indentations 20A may be separately formed and subsequently attached to housing 20. Moreover, the indentations 20A may define a generally C-shaped profile (when viewed from above) such that any tendency of inter-cell sliding movement along sliding direction S is additionally resisted by the columnar shape that extends a substantial entirety of the height (which coincides with the stacking dimension of the Y-axis of FIG. 1) of the housing 20. As such, the shape of the molded indentations 20A help them act as a bulkhead against movement in the X-direction of FIG. 1, as well as provide such additional resistance along one movement elsewhere within the X-Z plane. Insulation 20B may be placed in the interstitial region between the periphery of the fuel-cell stack 1 and an internal wall of the housing 20 to provide electrical isolation.

As mentioned above, in the embodiment depicted in FIG. 6, datum 18 may not include the conical feature 18A. Likewise, such variant (As well as the variant of FIG. 3) may avoid having a pin-accepting aperture, as the unitary built-up structure formed by the molding of datum 18 according to an aspect of the present invention onto multiple stacked ones of the fuel cells 15 promotes secure, accurate placement of each of the fuel cells 15 in the stacking dimension without having to rely upon pins or other supplemental structure. Moreover, the tabs 17G that are formed in the peripheral structure of each bipolar plate or the bipolar plate assembly 17 may be made to engage with the complementary-shaped cutouts or recesses of the housing 20 such that the tendency of each cell or plate within the stack to move in response to a shearing (i.e., in-plane) force is resisted by the unitary nature of the datum 18 and tab 17G to form a composite-like through-the-thickness inter-plate structure.

Referring again to FIG. 4, in another structural reinforcement embodiment, a vertically elongate retainer 50 (preferably made from aluminum or steel) may extend between the end unit plates 5, 10 of FIG. 1 such that it substantially envelopes or otherwise covers the projecting stacked datum 18 in a manner that mimics the C-shaped indentations 20A that are integrally-formed into the housing 20 formed from extruded aluminum of FIG. 6. Such retainer may be bolted or otherwise secured to the end unit plates 5, 10 as a way to achieve the structural rigidity without having to form a separate housing 20. In yet another variation, instead of being secured directly to the end unit plates 5, 10, the retainer may be secured to a box-like frame that is formed around the fuel-cell stack 1. Such a frame may additionally include shims 55 to help adjust for variations in the height of individual ones of the fuel cells 15 that make up the fuel-cell stack 1. Additional equipment is also depicted, including current collector plates 60, 65 that extend laterally out of the respective end unit plates 5, 10 to connect to electrical circuitry (not shown). Insulator plates 70 may be placed between the lower surface of the end unit plates 5, 10 and a facingly-adjacent upper surface of the fuel-cell stack 1 to promote electrical and thermal insulation between them.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention it is noted that the term "substantially" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

For the purposes of describing and defining the present invention it is noted that the terms "fuel cell" or the like are utilized herein to represent a one or more individual cells used to provide electric current, preferably for vehicular, propulsive or related purposes. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method of assembling a fuel cell stack, the method comprising:
   arranging a plurality of substantially planar fuel cells along a stacking dimension within a stacking fixture, each of the plurality of substantially planar fuel cells comprising at least a membrane electrode assembly placed facingly-adjacent to a bipolar plate that defines at least one integrally-formed edge extension therein;
   pouring a potting material into a portion of the stacking fixture that defines a shape that substantially corresponds to the integrally-formed edge extension such that upon curing, the potting material forms a datum that is secured to the arranged fuel cells along the stacking dimension to provide an increased resistance to inter-cell movement of the plurality of substantially planar fuel cells along a dimension that is substantially orthogonal to the stacking dimension; and
   securing the plurality of substantially planar fuel cells within a housing.

2. The method of claim 1, wherein the housing defines a complementary-shaped extension formed within the housing such that cooperation between the datum and the complementary-shaped extension increases resistance to the inter-cell movement.

3. The method of claim 1, wherein the datum is placed adjacent to and outside of a corner formed by the plurality of substantially planar fuel cells.

4. The method of claim 3, wherein the datum comprises a plurality of data, each of the plurality of data placed adjacent to and outside of a respective corner formed by the plurality of substantially planar fuel cells.

5. The method of claim 1, wherein the datum is placed adjacent an edge formed by the plurality of substantially planar fuel cells.

6. The method of claim 2, wherein the complementary-shaped extension defines a substantially columnar structure along the stacking dimension.

7. The method of claim 1, wherein the potting material is selected from the group consisting of epoxies and elastomers.

8. The method of claim 2, wherein the plurality of substantially planar fuel cells includes a plurality of groups, the datum being cooperative with a respective one of the groups, the groups comprising from about 8 to about 32 of the plurality of substantially planar fuel cells.

9. The method of claim 1, wherein the datum defines a projection that extends at least partially along the stacking dimension.

10. A method of assembling a plurality of fuel cells each of which comprises at least a membrane electrode assembly placed facingly-adjacent to a bipolar plate that defines at least one integrally-formed edge extension therein, the method comprising:
    defining within a stacking fixture at least one mold shape configured to receive a potting material therein;
    arranging the plurality of fuel cells along a stacking dimension within the stacking fixture; and
    pouring the potting material into the mold such that upon curing, the potting material forms a datum that is secured to the plurality of fuel cells along the stacking dimension to provide an increased resistance to inter-cell movement of the plurality of fuel cells along a dimension that is substantially orthogonal to the stacking dimension.

11. The method of claim 10, wherein said the datum bridges a group of the plurality of fuel cells that comprises from about 8 to about 32 of the plurality of fuel cells.

12. The method of claim 10, further comprising placing the plurality of cells into a housing such that a complementary resistance fit between the datum and the housing is established.

13. The method of claim 10, wherein the datum is placed along at least one of an edge and a corner of the plurality of fuel cells.

14. The method of claim 13, wherein the datum projects laterally beyond a periphery defined by the plurality of fuel cells.

15. A fuel cell stack comprising:
    a plurality of fuel cells arranged in an adjacently facing relationship along a stacking dimension, each of the plurality of fuel cells comprising at least a membrane electrode assembly placed facingly-adjacent to a bipolar plate that defines at least one integrally-formed edge extension therein; and
    at least one potted datum secured to the plurality of fuel cells along the stacking dimension to provide an increased resistance to inter-cell movement along a dimension that is substantially orthogonal to the stacking dimension.

16. The stack of claim 15, further comprising a housing that defines a shape therein that forms a complementary resistance fit with the datum.

17. The stack of claim 16, wherein the shape defined in the housing defines a substantially columnar structure along the stacking dimension.

18. The stack of claim 15, wherein the datum comprises a material selected from the group consisting of epoxies and elastomers.

19. The stack of claim 15, wherein the integrally-formed edge extension extends laterally outward along an edge formed by the plurality of fuel cells.

20. The stack of claim 15, wherein the integrally-formed edge extension extends laterally outward along a corner formed by the plurality of fuel cells.

* * * * *